J. W. COCKBURN.
POWER TRANSMISSION DEVICE.
APPLICATION FILED DEC. 22, 1913.

1,153,031.

Patented Sept. 7, 1915.
4 SHEETS—SHEET 1.

Witnesses.

Inventor:
J. W. COCKBURN

J. W. COCKBURN.
POWER TRANSMISSION DEVICE.
APPLICATION FILED DEC. 22, 1913.

1,153,031.

Patented Sept. 7, 1915.
4 SHEETS—SHEET 3.

Witnesses.

Inventor.
J. W. COCKBURN

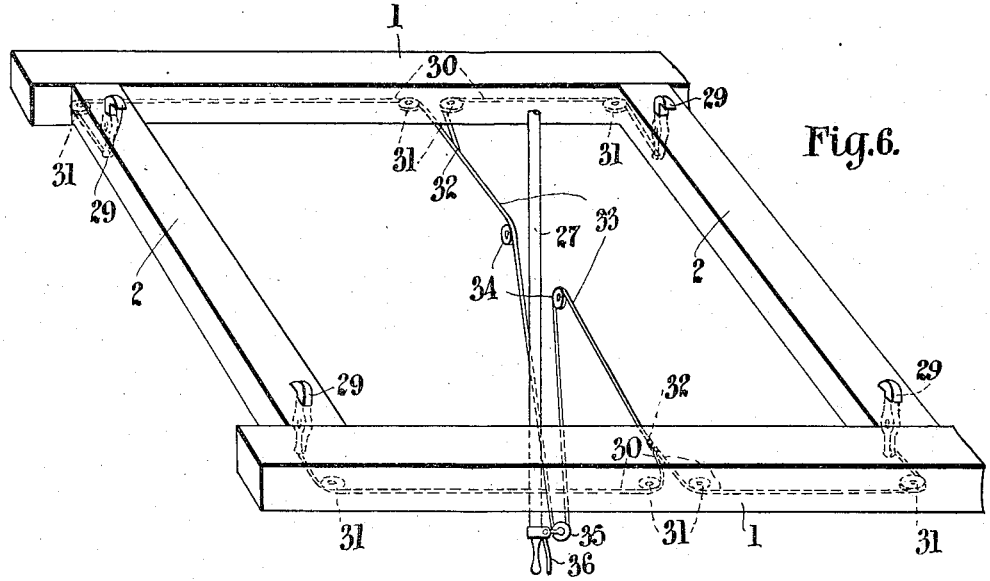
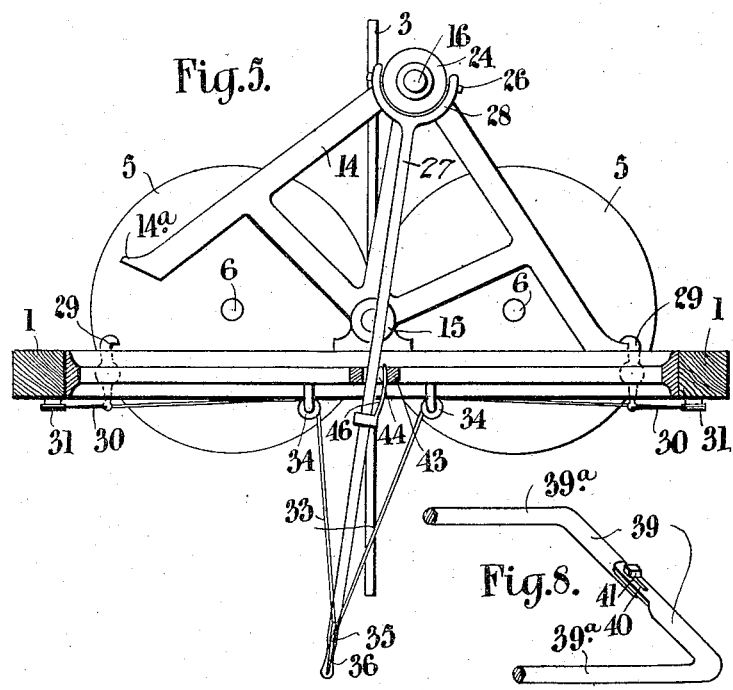

UNITED STATES PATENT OFFICE.

JOHN WILSON COCKBURN, OF DUNDAS, ONTARIO, CANADA.

POWER-TRANSMISSION DEVICE.

1,153,031.  Specification of Letters Patent.  Patented Sept. 7, 1915.

Application filed December 22, 1913. Serial No. 808,233.

*To all whom it may concern:*

Be it known that I, JOHN WILSON COCKBURN, of the town of Dundas, in the county of Wentworth, in the Province of Ontario, Canada, have invented certain new and useful Improvements in Power-Transmission Devices, of which the following is the specification.

My invention relates to improvements in power transmission devices and the object of the invention is to devise a transmission device of the friction type in which friction wheels are adapted to bear on each side of the friction disk whereby any side strain on the same is equalized.

A further object is to construct a power transmission device which can be readily reversed.

A still further object is to devise a power transmission device which can be operated at varied speeds in either direction.

Another object is to devise means for controlling the variations of speed of the device to which is inter-connected means for reversing the mechanism.

My invention consists of a pair of movable friction wheels adapted to engage the friction disk on each side of the same equalizing the strain thereon, longitudinally slidable shafts connected to the friction wheels, intermeshing gears mounted on said shafts, rocker brackets, a longitudinal shaft mounted on said rocker brackets, a flanged gear slidably keyed to said shaft and adapted to mesh with either of the aforesaid gears, means for simultaneously moving the slidable shafts longitudinally for varying the speed, inter-connected means for throwing the flanged gear into mesh with either of the aforesaid inter-meshing gears, and means for throwing the friction wheels simultaneously out of engagement with the friction disk all as hereinafter more particularly described and illustrated in the accompanying drawings in which:—

Figure 1:
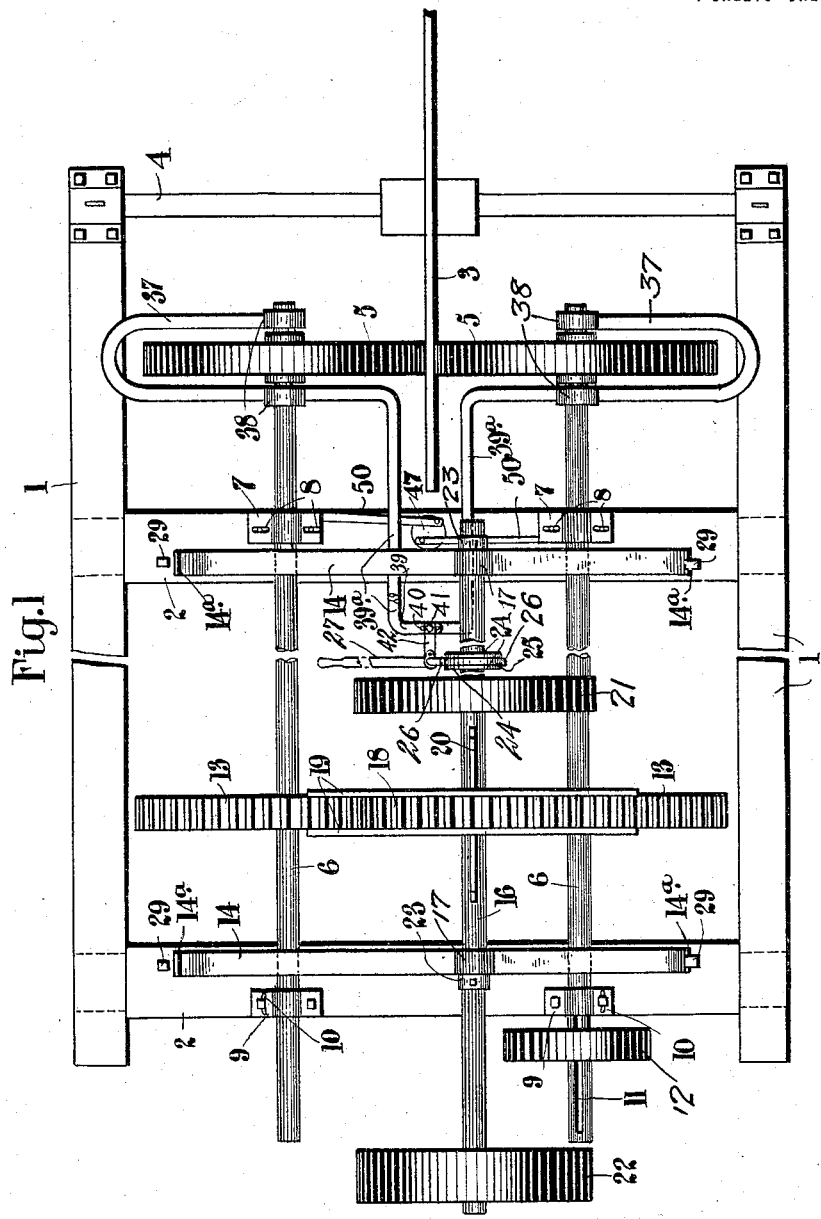
Figure 2:
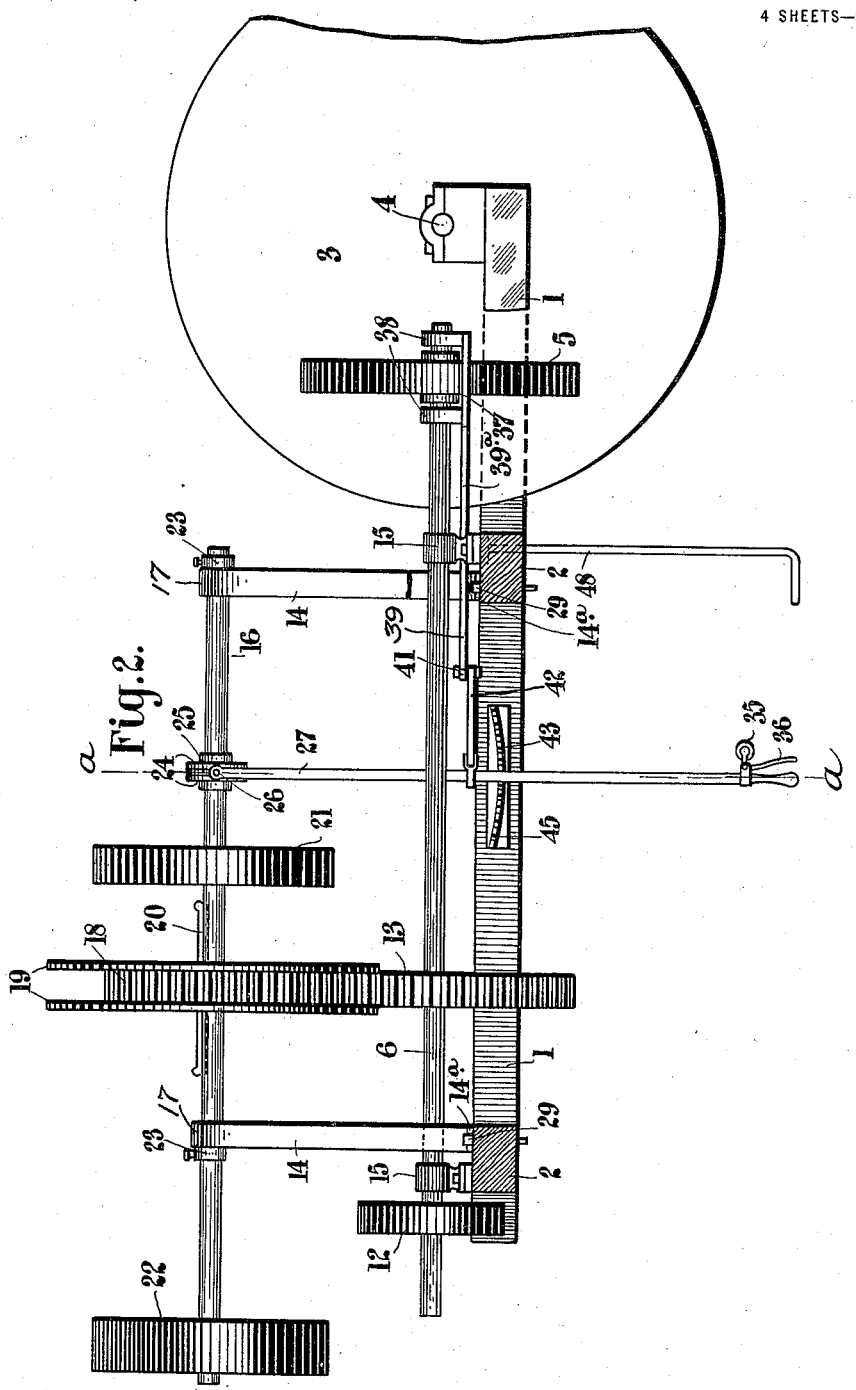
Figure 3:
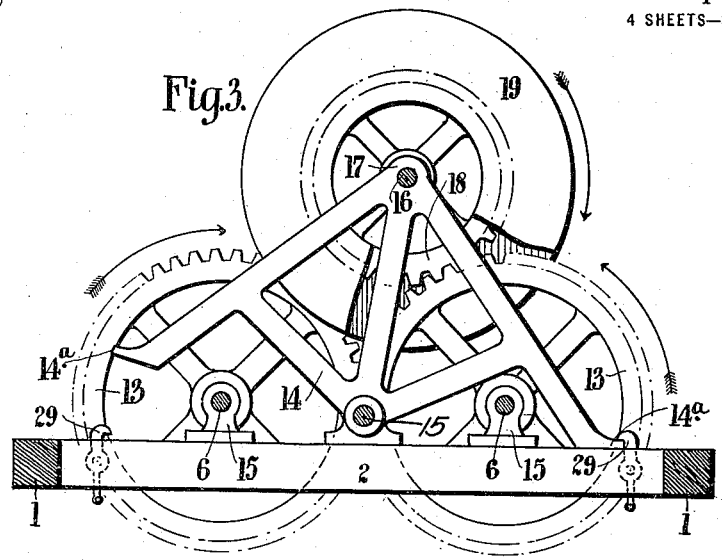
Figure 4:
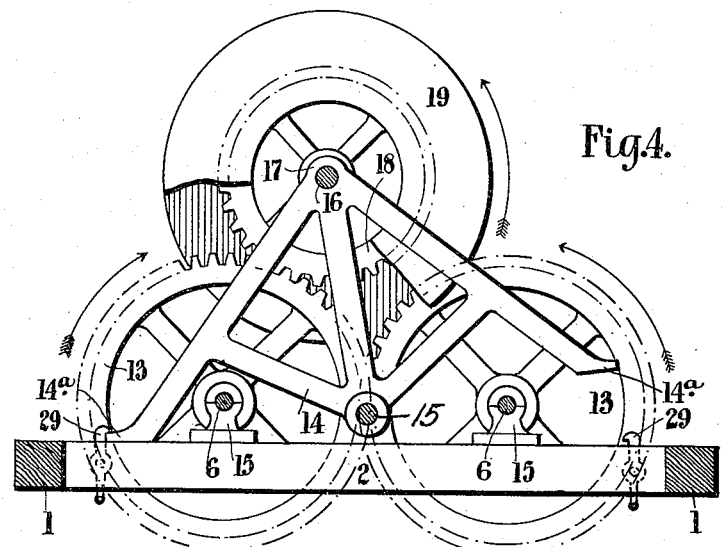
Figure 7:
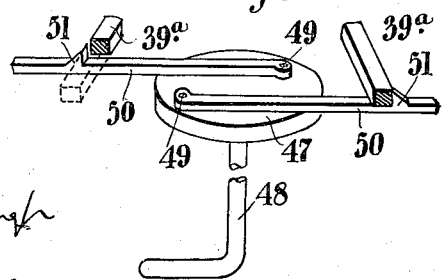

Figure 1 represents a plan view (broken away intermediately) of a device constructed according to my invention. Fig. 2 is a side elevation thereof partly in section. Fig. 3 is a sectional end view of my device taken from the end remote from the friction disk showing the flanged gear meshing with the right hand gear on one of the slidable shafts for operating the device in one direction. Fig. 4 is a similar view to Fig. 3 showing the flanged gear meshing with the left hand gear for operating the device in the reverse direction. Fig. 5 is a cross-sectional view through the line *a—a* (Fig. 2) showing the means for controlling the shifting of the flanged gear. Fig. 6 is a perspective view of a portion of the supporting frame for my device showing the locking arrangement for the rocker brackets and the means for releasing the same. Fig. 7 is a perspective detail showing the means for throwing the friction wheels out of engagement with the friction disk. Fig. 8 is a perspective detail of a portion of the yoke connected to the brackets supporting the friction wheels.

Like characters of reference indicate corresponding parts in the different views.

1, 1 are the side bars of the supporting frame.

2, 2 are the cross bars thereof.

3 is the friction disk and 4 is the line shaft upon which the friction disk is mounted.

5, 5 are the friction wheels.

6, 6 are the longitudinally slidable shafts to which the friction wheels are connected.

7, 7 are bearings for the shafts 6 mounted on one of the cross bars 2 and having the lateral slots 8 therein to permit the bearings 7 to move a certain extent laterally.

9, 9 are bearings for the shafts 6 mounted on the other of the cross bars 2, the said bearings being pivotally connected at their inner ends to the cross bar 2 and having arc-shaped slots 10 therein to permit of the same being swung about the pivot points.

11 is a longitudinal key-slot in one of the shafts 6 and 12 is a pulley mounted on such shaft and keyed thereto, said shaft being capable of moving longitudinally relatively to the said pulley.

13, 13 are inter-meshing gears rigidly connected to the shafts 6.

14, 14 are rocker brackets swingably mounted on the bearings 15, such bearings being secured to the cross bars 2 of the frame.

16 is a longitudinal shaft mounted on the rocker brackets in bearings 17 therein.

18 is a gear having flanges 19 adapted to be slidably keyed to the longitudinal shaft 16 by the saddle-key 20.

21 and 22 are pulleys rigidly connected to the longitudinal shaft 16, the former being connected between the rocker brackets and the latter to the end of the shaft remote from the friction disk.

23, 23 are collars secured to the shaft 16 outside of the rocker brackets and adapted to prevent longitudinal movement of such shaft.

24, 24 are collars rigidly connected to such shaft and 25 is a disk interposed between the collars 24 and freely mounted on such shaft and having extending pins 26 thereon.

27 is a lever having a forked upper end 28 adapted to be pivotally connected to the pins 26.

29, 29 are pawls pivotally connected in the cross bars 2 of the frame and adapted to engage the extremities 14ª of the rocker brackets 14 when they are in the proper position as will be hereinafter described.

30, 30 are cables connected to the lower extremities of the pawls and extending around pulleys 31 suitably attached to the frame. The cables 30 are connected together at the points 32 and the cable 33, passing over rollers 34 and around a roller 35 mounted on a bell crank lever 36 suitably pivoted to the lower end of the lever 27, has its ends connected to the cables 30 at the points 32.

37, 37 are U-shaped brackets having bearing portions 38, said bearing portions surrounding the shafts 6 on each side of the corresponding friction wheel 5.

39 is a yoke connected to the brackets 37. The yoke is divided at one end and one portion has the lateral slot 40.

41 is a bolt extending through the lateral slot in one portion and screwing into the other portion.

42 is a link pivotally connected at one end to the yoke 39 by the aforesaid bolt 41 and pivotally connected at the other end to the lever 27.

43 is a quadrant having a longitudinal slot 44 therein through which the lever 27 extends, said quadrant being suitably mounted on the frame and having suitable teeth 45 on one side of such slot.

46 is a spring pawl secured to the lever and adapted to engage the teeth of the quadrant.

47 is a disk having a depending lever 48, such disk being rotatably mounted in one of the cross bars 2 and having suitably arranged upwardly extending pins 49.

50, 50 are arms connected to the inner ends of the bearing 7 at one end of each and pivotally connected at their other ends to the disk 47 by the pins 49.

51, 51 are projections on the upper faces of such arms adapted to engage the longitudinal portions 39ª of the yoke 39.

The operation of the device is as follows:—Assuming that it is desired to have the power pulley connected to the shaft 16 and such pulley to be revolved in a clockwise direction, the flanged gear 18 is thrown over into mesh with the right hand gear 13 and as it is to be understood that the friction disk 3 is run in a counter clock-wise direction the power pulley such as 21 or 22 will be revolved in a clock-wise direction as is shown in Fig. 3. In order to throw the flanged gear over into such position as above described the lever 27 is held at the handle and the lower end of the bell crank lever 36 is pressed in against the handle which draws the pulley 35 downwardly, consequently pulling on the cable 33 and also on the cables 30 to which such cable 33 is connected which will cause the pawls 29 to be thrown out of engagement with the extremities 14ª of the rocker brackets 14 and thus permit such rocker brackets to be swung. Then by swinging the lower end of the lever over to the left the rocker brackets and shaft 16 will be thrown over to the right until the flanged gear 18 comes into mesh with the right hand gear 13 when upon releasing the bell crank lever 36 the pawls 39 will engage the extremities 14ª of the rocker brackets 14 and thus hold the same in position.

When it is desired to reverse all that is necessary is to repeat the above operation and throw the flanged gear 18 over into mesh with the left hand gear 13 by throwing the lever 27 over to the right instead of to the left, when the shaft 16 will be revolved in the opposite or reversed direction, as is shown in Fig. 4. Of course it is to be understood when it is desired to reverse the shaft 16 it would be necessary to throw the friction wheels 5 out of engagement with the friction disk prior to making such reversal, and for this purpose the lever 48 and disk 47 are provided. When it is desired to throw the friction wheels out of engagement with the friction disk the lever 48 is turned in a clock-wise direction which by reason of the arms 50 being connected to the bearings 7 pushes these bearings outwardly which throws the shafts 6 out of true a small extent thus spreading the friction wheels 5 and throwing them out of engagement with the friction disk 3. In order to avoid springing the shaft the bearings 9 are pivotally mounted on the cross bars 2 so that the bearings will be capable of swinging a certain extent when such operation takes place. When it is desired to throw the friction wheels 5 into engagement with the friction disk 3 the lever 48 is turned in the opposite direction and the bearings 7 drawn inwardly. In order to take the strain off such bearings to a certain extent the projections 51 are provided on the arms 50, such projections being adapted to bear against the portions 39ª of the yoke which has a tendency to throw the brackets 37 inwardly at the same time.

I will now describe the means by which I secure different speeds. When a low speed is required the lever 27 is pushed forward which moves the yoke and brackets 39 and 37 respectively in a forward direction, consequently moving the slidable shafts 6 forwardly and as the friction wheels are carried by such shaft this movement of the lever moves the friction wheels nearer to the center of the friction disk 3 and consequently a low speed is attained as the friction wheels run at a speed more nearly equal to the speed of the line shaft and consequently the shaft 16 is run slower. To run at a high speed the friction wheels 5 and shafts 6 are drawn back by moving the lever in the opposite direction to that described above. It will be readily seen that the spring pawl 46 will engage the teeth 45 of the quadrant and will consequently hold the friction wheels in any desired position. Of course where the device is running it will be necessary to throw the friction wheels out of engagement when it is desired to change the position of the same relatively to the friction disk and consequently the yoke 39 is divided as has already been described and connected together by the bolt 41 extending through the slot 40 which will permit the yoke to be thrown out laterally a certain extent when the wheels 5 are thrown out of engagement with the disk.

It is to be understood that the device can be operated in either direction with equal facility and that the speed can be varied whether the shaft 16 is revolving in the forward or reverse directions. Further the flanged gear 18 is slidably keyed to the shaft 16 which will permit of its moving longitudinally relatively thereto when the shafts 6 move longitudinally to vary the speed.

It will be seen upon reference to the drawings that I have shown a pulley 12 slidably keyed to one of the shafts 6. This provision is made where it is desired to operate a machine from such pulley where it is not desired to reverse the same but where it is required to operate the machine at varied speeds as for instance in connection with a turret lathe. Also in the drawings I show two pulleys mounted on the shaft 16, one between the rocker brackets and the other on one end of the shaft. The former would be used where it is desired to confine the length of the transmission device and where a large pulley is not required.

Many modifications may be made in the invention without departing from the spirit of the same or the scope of the claims and the form shown is to be taken in an illustrative and not in a limiting sense.

What I claim as my invention and desire to secure by Letters Patent is:—

1. In a power transmission device the combination with a friction disk, of friction wheels engaging the friction disk on each side thereof, longitudinal shafts, the friction wheels rigidly mounted upon the longitudinal shafts, intermeshing gears rigidly mounted on the longitudinal shafts, laterally swingable rocker brackets, a power shaft rotatably mounted on the said rocker brackets, a flanged gear slidably keyed to the said power shaft and means for simultaneously swinging the rocker brackets one way or the other for throwing the flanged gear into engagement with one or other of the inter-meshing gears.

2. In a power transmission device the combination with a friction disk, of friction wheels engaging the friction disk on each side thereof, longitudinal shafts, the friction wheels rigidly mounted upon the longitudinal shafts, inter-meshing gears rigidly mounted on the longitudinal shafts, laterally swingable rocker brackets, a power shaft rotatably mounted on the said rocker brackets, a flanged gear slidably keyed to the said power shaft, means for simultaneously swinging the rocker brackets one way or the other for throwing the flanged gear into engagement with one or other of the inter-meshing gears, and means for locking the rocker arms in position.

3. In a power transmission device, the combination with a friction disk, of friction wheels engaging the friction disk on each side thereof, longitudinal shafts, the friction wheels rigidly mounted upon the longitudinal shafts, inter-meshing gears rigidly mounted on the longitudinal shafts, laterally swingable rocker brackets, a power shaft rotatably mounted on the said rocker brackets, a flanged gear slidably keyed to the said power shaft and meshing with one of the aforementioned gears, a controlling lever having its upper end freely mounted on the power shaft, pivotally mounted pawls adapted to engage the extremities of the rocker brackets for locking the flanged gear in position, a bell crank lever on the lower end of the aforesaid lever, pulley blocks, and cables passing over the pulley blocks and connected to the lower end of the pawls for controlling the operation of the pawls.

4. In a power transmission device the combination with a friction disk, of friction wheels engaging the friction disk on each side thereof, longitudinally slidable shafts, the said friction wheels rigidly mounted on said shafts, inter-meshing gears rigidly secured to the longitudinal shafts, a longitudinal power shaft, a gear slidably keyed to said power shaft, and meshing with one of the aforementioned gears, a depending lever freely mounted on said power shaft, and means controlled by the lever for simultaneously moving the aforesaid longitudinal shafts longitudinally.

5. In a power transmission device the combination with a friction disk, of friction wheels engaging the friction disk on each side thereof, longitudinally slidable shafts, the said friction wheels rigidly mounted on said shafts, inter-meshing gears rigidly secured to the longitudinal shafts, a longitudinal power shaft, a gear slidably keyed to said power shaft and meshing with one of the aforementioned gears, a depending lever freely mounted on said power shaft, a yoke, supporting brackets for the friction wheels having bearing portions surrounding the longitudinal shafts and connected to said yoke, a link pivotally connected at one end to said yoke and pivotally connected at the other end to the lever intermediately of its length.

6. In a power transmission device the combination with a friction disk, of friction wheels engaging the friction disk on each side thereof, longitudinally slidable shafts, the said friction wheels rigidly mounted on said shafts, inter-meshing gears rigidly secured to the longitudinal shafts, a longitudinal power shaft, a gear slidably keyed to said power shaft and meshing with one of the aforementioned gears, a depending lever freely mounted on said power shaft, a yoke, supporting brackets for the friction wheels having bearing portions surrounding the longitudinal shafts and connected to said yoke, a link pivotally connected at one end to said yoke and pivotally connected at the other end to the lever intermediately of its length, and means for normally locking the lever in position.

7. In a power transmission device the combination with a friction disk, of friction wheels engaging the friction disk on each side thereof, longitudinally slidable shafts, the said friction wheels rigidly mounted on said shafts, inter-meshing gears rigidly secured to the longitudinal shafts, a longitudinal power shaft, a gear slidably keyed to said power shaft and meshing with one of the aforementioned gears, a depending lever freely mounted on said power shaft, a yoke, supporting brackets for the friction wheels having bearing portions surrounding the longitudinal shafts and connected to said yoke, a link pivotally connected at one end to said yoke and pivotally connected at the other end to the lever intermediately of its length, and a toothed quadrant having a longitudinal slot therein, a spring pawl secured to the lever intermediately of its length and adapted to engage the teeth of the quadrant, said lever adapted to extend down through the longitudinal slot in the quadrant.

8. In a power transmission device the combination with a friction disk, of friction wheels engaging the friction disk on each side thereof, longitudinally slidable shafts, the said friction wheels ribidly mounted on the said shafts, inter-meshing gears rigidly secured to the said shafts, rocker brackets, a power shaft, a double flanged gear slidably keyed to the power shaft and meshing with one of the aforesaid gears, a lever freely connected to the power shaft for swinging the rocker brackets simultaneously for throwing the aforesaid flanged gear into engagement with the other of the aforesaid gears, and means connected to the lever for simultaneously moving the said shafts longitudinally.

9. In a power transmission device the combination with a friction disk, of friction wheels engaging the friction disk on each side thereof, longitudinally slidable shafts, the friction wheels rigidly mounted upon the said shafts, intermeshing gears rigidly mounted on the said shafts, laterally swingable rocker brackets, a power shaft rotatably mounted on the said rocker brackets, a double flanged gear slidably keyed to the said power shaft and meshing with one of the aforementioned gears, a controlling lever having its upper end freely mounted on the power shaft, a yoke, supporting brackets for the friction wheels having bearing portions surrounding the said shafts and connected to said yoke, and a link pivotally connected at one end to said yoke and pivotally connected at the other end to the lever intermediately of its length whereby the longitudinal movement of the longitudinally slidable shafts is controlled.

10. In a power transmission device the combination with a friction disk, of friction wheels engaging the friction disk on each side thereof, longitudinally slidable shafts, the friction wheels rigidly mounted upon the said shafts, intermeshing gears rigidly mounted on the said shafts, laterally swingable rocker brackets, a power shaft rotatably mounted on the said rocker brackets, a double flanged gear slidably keyed to the said power shaft and meshing with one of the aforementioned gears, a controlling lever having its upper end freely mounted on the power shaft, a yoke, supporting brackets for the friction wheels having bearing portions surrounding the said shafts and connected to said yoke, a link pivotally connected at one end to said yoke and pivotally connected at the other end to the lever intermediately of its length whereby the longitudinal movement of the longitudinally slidable shafts is controlled, means for simultaneously locking the rocker brackets in the required position, and means for locking the controlling lever in the required position.

11. In a power transmission device the combination with a friction disk, of friction wheels engaging the friction disk on each side thereof, longitudinal shafts, the friction wheels rigidly mounted upon the longitudinal shafts, bearings for the longitudinal shafts, the bearings adjacent to the friction disk being laterally adjustable and the bearings remote from the friction disk pivoted at their inner extremities and having arc-shaped slots in their outer ends for permitting the bearings to swing about their pivot points, and means connected to the bearings adjacent to the friction disk for spreading the longitudinal shafts for throwing the friction wheels out of engagement with the friction disk.

12. In a power transmission device the combination with a friction disk, of friction wheels engaging the friction disk on each side thereof, longitudinal shafts, the friction wheels rigidly mounted upon the longitudinal shafts, bearings for the longitudinal shafts, the bearings adjacent to the friction disk being laterally adjustable and the bearings remote from the friction disk pivoted at their inner extremities and having arc-shaped slots in their outer ends for permitting the bearings to swing about their pivot points, a suitably mounted horizontally disposed disk, a lever connected to said disk, and arms connected at their outer ends to the inner ends of the bearings adjacent to the friction disk and pivotally connected at their inner ends to the disk.

13. In a power transmission device the combination with a friction disk, of friction wheels engaging the friction disk on each side thereof, longitudinal shafts, the friction wheels rigidly mounted on the longitudinal shafts, a U-shaped yoke, supporting brackets for the friction wheels having bearing portions surrounding the longitudinal shafts and connected to the U-shaped yoke, a suitably mounted horizontally disposed disk, a lever connected to said disk, arms connected at their outer ends to the inner ends of the bearings adjacent to the friction disk and pivotally connected at their inner ends to the disk, and projections on the upper sides of the arms adapted to engage the longitudinal portions of the yoke.

14. In a power transmission device the combination with a friction disk, of friction wheels engaging the friction disk on each side thereof, longitudinally slidable shafts, the friction wheels rigidly mounted upon the longitudinal shafts, of a U-shaped yoke divided into two portions, the end of one portion having a slot therein, a bolt extending through the slot and through the other portion of the yoke, supporting brackets for the friction wheels, having bearing portions surrounding the longitudinal shafts and connected to the extremities of the U-shaped yoke, a controlling lever for controlling the longitudinal movement of the longitudinally slidable shafts, and a link pivotally connected at one end to the lever intermediately of its length, said bolt extending through the other end of the link and pivotally connecting the same to the yoke.

15. In a power transmission device the combination with a friction disk, of friction wheels engaging the friction disk on each side thereof, longitudinally slidable shafts, the friction wheels rigidly mounted upon the longitudinal shafts, of a U-shaped yoke, supporting brackets for the friction wheels having bearing portions surrounding the longitudinal shafts and connected to the extremities of the U-shaped yoke, a controlling lever fulcrumed at its top, a link pivotally connected at one end to the U-shaped yoke and at the other end to the lever intermediately of its length for controlling the longitudinal movement of the longitudinally slidable shafts.

In testimony whereof I have signed at the city of Hamilton, in the county of Wentworth, in the Province of Ontario, Canada, this 26th day of November 1913.

JOHN WILSON COCKBURN.

Witnesses:
D. M. FETHERSTONHAUGH,
E. M. NEAMS.

Copies of this patent may be obtained for five cents each, by addressing the "Commissioner of Patents, Washington, D. C."